3,676,150
LOW CALORIE YEAST LEAVENED
BAKED PRODUCTS
Martin Glicksman, Valley Cottage, Elizabeth H. Farkas, Yonkers, and Sadie Carter, Ossining, N.Y., assignors to General Foods Corporation, White Plains, N.Y.
No Drawing. Filed June 1, 1970, Ser. No. 42,549
Int. Cl. A21d 13/04, 13/06
U.S. Cl. 99—90 R                    9 Claims

ABSTRACT OF THE DISCLOSURE

Low calorie, yeast leavened baked goods, including bread, are prepared from a flour comprised of gums, starch and alpha-cellulose. The sponge structure of the reduced calorie products is similar to that of wheat flour-containing baked goods.

BACKGROUND OF THE INVENTION

Field of the invention

This invention relates, in general, to baked products. In particular, the invention is directed to low calorie yeast leavened baked products, the low calorie flour employed as an essential ingredient therein, and the process for manufacturing such baked products.

DESCRIPTION OF THE PRIOR ART

Low calorie foods play an ever increasing important role in the diet. Low calorie beverages and candies have enjoyed widely accepted consumer appeal, but the acceptance of low calorie farinaceous materials has, for the most part, been restricted to cookies and crackers or other substantially non-leavened baked products. Battista (U.S. Pat. No. 3,023,104) very adequately states the many reasons for fulfilling the need for nonnutritive agents for use as ingredients in reduced calorie farinaceous foods exhibiting satisfactory consumer appeal.

It is surprising that bread, being such a basic food item, has not, within present knowledge, been successfully produced with material having a low or reduced caloric content as compared with the conventional ingredients. Although the prior art has long sought methods of producing low calorie breads, the endeavors have been less than successful and appear to have been thwarted by insurmountable obstacles.

Battista, supra, discloses use of "crystallite aggregates" of anhydroglucose units of specified chain length as a nonnutritive agent in bakery products, and in a somewhat incidental manner, includes bread as one of the baked products. There appears to be no disclosure in the Battista patent as to how, or to what extent, the crystallite aggregates are incorporated into a bread dough and no disclosure as to how the bread dough, or for that matter, any yeast leavened bakery product, can be satisfactorily made employing the nonnutritive agent of his invention.

Similarly, Swanson, U.S. Ser. No. 753,708 assigned to the same assignee as the instant invention, mentions that alpha-cellulose can be employed as an ingredient in bread. However, Swanson also fails to disclose how a satisfactory bread or any other yeast leavened bakery product can be made with the use of alpha-cellulose.

In any event, and with full realization that small amounts of extenders may be added to bakery products without noticeably or materially detracting from the quality of the product as gaged by the average consumer, there has existed a need for a method and a product therefrom for a high quality yeast leavened bread having a caloric intensity of about one-half that of conventional white bread. This need has not, until the present invention, been successfully fulfilled. Consequently, the instant invention represents a significant advance in the commercial process of baking low calorie breads of high quality and satisfactory consumer appeal.

SUMMARY OF THE INVENTION

It is, therefore, an object of the instant invention to provide a low calorie yeast leavened bakery product having the taste, texture and other characteristics substantially equivalent to those of the conventional counterparts with their normal high caloric intensity.

It is another object of the invention to provide yeast leavened bakery products having approximately one-half the caloric content of the conventional counterpart baked goods.

It is still another object of the invention to provide a yeast leavened white bread having 50% or less of the normal caloric intensity of white bread and which, therefore, can be designated "low-calorie" bread.

It is a further object of the invention to provide a flour having a significantly lower caloric content than either wheat or corn flour and which can be used in the formulation of many baked products in place of wheat or corn flour on a direct substitution basis.

It is still a further object of the instant invention to provide a flour which imparts to the yeast leavened dough of which it is an ingredient, a consistency which is more amenable to modern, continuous bread making methods and equipment than conventional doughs containing wheat flour.

These objects, and others, are realized by incorporating in the flour of the invention alpha-cellulose, starch and hydrophilic gums. Briefly, the invention is predicated on the use of three (3) materials in correct proportion to constitute a flour which has essentially the same, or nearly the same, physical characteristics and exhibits the equivalent, and in some respects superior, properties as wheat flour when employed in a yeast leavened dough. It has been surprisingly discovered that the flour of this invention is superior to wheat flour, especially with respect to moisture retention which effects a restraint on the rate of staling of the baked products in which it is employed and also, produces a dough which is more pourable than conventional doughs and, therefore, better suited for use in the making of bread by the continuous method as disclosed in the U.S. Pat. No. 2,953,460 of J. C. Baker.

It has been found that alpha-cellulose has the capability of attracting and holding considerably more moisture to its surface than wheat or corn flour. This desirable attribute, which facilitates bread making and leads to a longer storage period before staling of finished product could not, however, be exploited unless the moisture retaining alpha-cellulose could be integrated with other components which together form a flour similar in most physical properties to wheat flour. That is, the flour when employed as an ingredient in a yeast leavened dough has to contribute to the plasticity of the dough to effect the highly desirable sponge structure that is developed during the proofing stage. The very essence of the invention resides in the combination of starch and cellulosic gums to cooperate with the surface moisture of the alpha-cellulose and with the alpha-cellulose per se to form a flour which has the same film forming characteristics as that of gluten-containing wheat flour.

The foregoing has been presented by way of an explanation of how the direct substitution of wheat or corn flour can be made with the flour of this invention as employed in yeast leavened bakery products to afford significantly lower caloric baked products of substantially equal quality and consumer appeal. Such explanation is only intended as a theory as to what is believed to occur, and the invention is not to be limited thereto.

The synergetic functionality of the components of the flour of the invention to provide yeast leavened baked goods which attain the above-mentioned objects and other features and advantages will become more fully apparent upon consideration of the following detailed description of the preferred embodiments.

DESCRIPTION OF THE PREFERRED EMBODIMENTS

It is the consensus that yeast leavened bread has better taste and aroma than chemically leavened bread; the latter having a baking powder taste and devoid of the characteristic aroma of freshly baked bread. It is the gluten in the wheat flour that acts as the binding agent to provide sufficient viscoelasticity to the dough to permit the yeast, during fermentation, to develop a sponge structured dough. A yeast leavened bread forms a continuous sponge structure within the gluten network prior to baking, and it is this sponge structure which is so important for good quality bread. Reduction in wheat flour content with an associated reduction in gluten, will, of course, limit the ability of the dough to form such a sponge structure. Therefore, the substitution of a singular nonnutritive agent, such as alpha-cellulose for a significant portion of the wheat flour, produces a defective yeast leavened baked product because the limited amount of gluten available is unable to form an acceptable sponge network. Not only is there insufficient gluten available, but that which is present is restrained from working correctly because of the presence of the alpha-cellulose and the high surface moisture content incorporated therewith. Also, augmenting the dough with additional gluten does not produce an anticipated satisfactory result. Instead of obtaining the desirable sponge during proofing, a dense crumbly-type material is formed, which when baked, leads to a "chalky" product.

It has, therefore, been necessary to construct a sponge-providing system which is independent of any gluten content and in so doing, it has been possible to eliminate *all* wheat flour (or corn flour) as a constituent in the flour of the instant invention. Surprisingly, it has been found that, although gums alone will not satisfactorily replace the gluten of the wheat flour, a combination of cellulosic gum and starch in conjunction with alpha-cellulose will effect a flour which performs equally as well and in some respects, superior to wheat flour plus having the additional attribute of having a low-caloric content ranging from about 30% to about 70% of that of wheat flour.

The alpha-cellulose constituent of the flour of this invention is a purified cellulose which may be obtained from several commercial sources. Alpha-cellulose marketed under the trade name Solka-Floc, a product manufactured by the Brown Company, 277 Park Ave., New York, N.Y., is representative of the preferred alpha-cellulose for use in the invention. The particle size of the alpha-cellulose should preferably range from about 140 to about 400 mesh (U.S. Standard Sieve size) and it has been found that the most preferred size to yield leavened breads with the optimum mouthfeel has a particle size of less than about 200 mesh (U.S. Standard Sieve).

While the "crystallite aggregates" of Battista (U.S. Pat. No. 3,023,104) can, in most instances, be used as a replacement for alpha-cellulose in the formulations of the instant invention, great care must be used in formulating doughs containing this ingredient since the material of Battista appears to have a greater tendency to adsorp water than commercial food grade alpha-cellulose.

The starch employed in the flour of the invention is preferably wheat starch although corn starch or, in fact, most any kind of edible starch used for food baking purposes performs substantially as well.

The preferred gums used in the formulation of the invention in conjunction with the starch to form the binding material to create the sponge structure of the dough are those nonnutritive gums selected from the cellulose class of gums. Hydroxypropylmethylcellulose, sodium carboxymethylcellulose, and methylethylcellulose are representative of the gum derivatives from cellulose which are preferred for purposes of the instant invention. Other gums, such as gelatin, propylene glycol alginate, polyvinylpyrrolidone, and arabinogalactan can be used, but do not appear to perform as well as the cellulosic gums. The gum content of the flour can vary from about 1% to about 15% based on the dry weight of the flour and the preferred range is from about 4% to about 5%. It has been found that hydroxypropylmethylcellulose and sodium carboxymethylcellulose at a weight ratio ranging from about 2:1 to about 1:1 is an effective gum system for purposes of the invention. A ratio of 5 parts of hydroxypropylmethylcellulose to 3 parts of sodium carboxymethylcellulose has been determined to be the preferred gum combination in the flour employed for white bread. For other baked goods, such as muffins, the preferred ratio is 5 to 4.

As a reduced caloric all-purpose flour, effective results are obtained when the level of starch on an "as is" weight basis in the flour ranges from about 30 to about 70% and the alpha-cellulose, on the same weight basis also ranges from about 30 to about 70%. The gum system i.e., a single gum or gums in combination is compounded with starch and alpha-cellulose to the extent of about 1% to about 10% based on the "as is" weight of the resulting flour.

The aforementioned ingredient levels may be altered to more specific amounts to tailor flours to be employed for specific baked goods. Thus, it has been found that if the flour is to be primarily used in the dough for white breads; adjustments in the level of starch can be made to where that ingredient is included to the extent of about 40% to about 50%; the alpha-cellulose level at about 40% to about 50% and the gum level altered to about 4% to about 5%.

In the employment of the flour of the invention, for a yeast leavened low calorie bread, it has been established that the wheat flour normally used can be completely eliminated. In so doing, a gluten-free low calorie bread is produced. The elimination of gluten from the low calorie bread affords additional dietetic advantages in that the bread can be used not only for its low caloric content advantages, but also in those diets restricted to low levels of protein.

The low calorie flour comprises approximately 90% of the dry or "as is" ingredients in the low calorie white bread formulation. The other ingredients are yeast, fat or oil, salt and a plasticizer. The yeast and salt perform their normal functions in the same manner as they do in conventional white bread. Since the flour contains no protein (gluten), dry egg white may be added in an amount sufficient only to produce an appealing brown colored crust in the baked bread. The oil or fat is employed to reduce the hardness of the crust and the plasticizer, usually sodium stearyl fumarate is employed to assist in uniformly distributing the starch throughout the mixture. Also, according to standard bread manufacturing procedures, preservatives, such as sorbate and benzoate, are added at effective levels, especially if the low calorie bread is to be stored for extended periods.

Water is added to the above combination to form a dough having a pourable batter consistency. When baked according to conventional bread baking procedures, the dough is converted to a finished baked product which has a moisture content ranging between about 50 to 60% on a weight basis. It has been determined that this moisture content, as compared with the 30% to 40% moisture of conventional white bread, not only has the effect of further lowering the caloric intensity of the bread but also produces a softer, finer structure and, more importantly, decreases the rate at which the bread becomes stale as compared with conventional breads. The finished baked bread of the invention as well as other yeast leavened baked products, such as rolls and muffins, have the texture, taste, and appearance equal, or superior in some respects, to those counterparts having a full caloric value, and have the further advantage of a reduced protein value and a significantly reduced caloric value of about 30% to about 70% of their respective counterparts.

The following examples illustrate the various facets of the invention. It should be understood, however, that these examples are merely meant to be illustrative and the invention is not to be limited thereto.

EXAMPLE I.—ALL-PURPOSE LOW CALORIE FLOUR

Following are the ranges of proportional amounts of each of the ingredients which comprise the low calorie all-purpose flour or culinary premix of the invention. The listed ingredients, when dry blended together within the range of weight levels designated, yield low calorie flours which may be employed in a variety of yeast leavened, or chemically leavened baked goods. Culinary mixes which include the flour of the invention, are capable of forming pourable batter-type doughs because they can tolerate greater amounts of water than doughs formed with wheat or corn flour. The resulting low calorie baked products, having a higher moisture content than their conventional counterparts, are less prone to staling as determined by organoleptic tests of texture and taste of the finished baked products throughout storage.

| Low calorie flour ingredient: | Weight percent ("as is" basis) |
|---|---|
| Alpha-cellulose | 30–70 |
| Starch (raw) | 30–70 |
| Hydrophilic gums | 1–10 |

EXAMPLE II.—LOW CALORIE FLOUR FOR YEAST LEAVENED BREAD

The all-purpose low calorie flour of Example I, when formulated with the ingredients at the levels designated below, is particularly suitable as the flour ingredient in yeast leavened doughs for white bread manufacture.

| Low calorie flour ingredient: | "As is" weight percent |
|---|---|
| Alpha-cellulose | 41.0 |
| Starch (raw) | 55.0 |
| Hydroxypropylmethylcellulose | 2.5 |
| Sodium carboxymethylcellulose | 1.5 |

The dry blended mixture has a caloric value of about 200 calories per 100 grams; this low caloric value is about 55% of that of conventional wheat flour.

The combination of nonnutritive cellulosic gums at the level of 4% of the "as is" weight of the flour and at a ratio of 5 parts hydroxypropylmethylcellulose to 3 parts sodium carboxymethylcellulose is the optimum combination of gum ingredients to cooperate with the starch and alpha-cellulose of the flour for forming a yeast leavened dough for white bread making purposes. Methocel 65 HG, 4000 cps., manufactured by the Dow Chemical Company, Midland, Mich., is representative of the hydroxypropylmethylcellulose and CMC 7LF manufactured by Hercules, Wilmington, Del., the sodium carboxymethylcellulose employed as the cellulosic gum combination in the preferred embodiment of the invention.

EXAMPLE III.—LOW CALORIE WHITE BREAD

(1) Dough formulation

| Ingredient: | "As is," weight percent |
|---|---|
| Low calorie flour (Example II) | 30.8 |
| Dextrose | 4.2 |
| Egg white (dried) | 2.0 |
| Salt | 0.9 |
| Sodium stearyl fumarate [1] | 0.3 |
| Unsaturaturated vegetable oil | 1.3 |
| Yeast (cake) | 1.5 |
| Water | 59.0 |
| | 100.0 |

[1] Pruv Type G—Charles Pfizer & Company, Brooklyn, N.Y.

(2) Bread preparation

A 600 gram batch of dough having the above formulation was prepared by blending together the dry ingredients, with the exception of the yeast cake and the dextrose, in a 5-quart Hobart mixer.

The yeast cake and dextrose (Cerelose—CPC International, Englewood Cliffs, N.J.) were dissolved in the water, at about 110° F., and added to the mix. The unsaturated vegetable oil (Wesson Oil—Hunt/Wesson Foods, Inc., Fullerton, Calif.) also was added and the total mass was blended for 15 minutes. During blending, the walls of the bowl were "scraped down" at 5 minute intervals. 500 grams of the batter was then poured into a greased one-lib. bread loaf pan and covered with aluminum foil. The pan was then kept in a proofing oven at 100° F. for 1½ hours and then baked at 375° F. for 35 minutes. The bread was removed from the oven and cooled at room temperature for 5 minutes before removing from the pan. The resulting product had a baked bread aroma, excellent appearance, and good taste and texture.

Since the bread was intended for immediate use, preservatives were not added to the dough formulation. However, sorbate or other preservatives could have been included in accordance with standard bread making procedures.

In contrast to the dough of conventional bread manufacture, the dough of the instant invention does not require kneading (to develop glutten), the proofing time is shorter and the batter consistency eliminates the need for hand shaping to take the loaf form, but admits to simply pouring the dough into a pan mold.

EXAMPLE IV.—LOW CALORIE FLOUR FOR YEAST-LEAVENED MUFFINS

| Ingredient: | Percent by weight ("As is" basis) |
|---|---|
| Alpha-cellulose | 47.9 |
| Starch (raw) | 47.4 |
| Hydroxypropylmethylcellulose | 2.6 |
| Sodium carboxymethylcellulose | 2.1 |

The dry blended reduced calorie flour or culinary mix according to the above formulation has a caloric value of approximately 172 cal./100 g.—about 47% of the caloric value of wheat flour (364 cal./100 g.). The ratio of the gum combination forming the cellulosic gum system is about 5 parts hydroxypropylmethylcellulose to 4 parts sodium carboxymethylcellulose and the flour is particularly adaptable for use as an ingredient in yeast leavened doughs for English muffins.

EXAMPLE V.—ENGLISH MUFFINS OF REDUCED CALORIC CONTENT

(1) Dough formulation

| Ingredient: | Parts by weight ("as is" basis) |
|---|---|
| Low calorie flour (Example IV) | 200 |
| Salt | 6 |
| Non-fat milk solids | 23 |
| Yeast (cake) | 12 |
| Water | 485 |
| Total | 726 |

(2) Muffin preparation

The yeast and non-fat milk solids were dissolved in the water warmed to about 100° F. The flour and salt were blended in a 5 quart Hobart mixer and the water solution of yeast and non-fat milk solids were combined and mixed to produce a smooth batter. The batter was covered and placed in a proofing oven and permitted to ferment for approximately 2½ hours. During the proofing stage the batter first increased in volume and then, toward the end of the proofing period, collapsed to about its original volume as anticipated. The batter, in muffin shape, was baked on a grill and was turned over once during baking. The resulting English muffin had an attractive appearing light brown surface, a soft moist texture, and good taste qualities. The caloric value was calculated to be about 71 cal./100 g. as compared with conventional English muffins at 193 cal./100 g. or, in other words, about a 63% reduction in caloric value.

From the foregoing examples which have been set out to illustrate the results of practicing the invention, it will be readily recognized that advantages result therefrom, particularly the advantage of having yeast leavened baked products of good quality and, importantly, having a significantly reduced caloric content as compared with their conventional counterparts.

Although exemplary embodiments of the invention have been disclosed and discussed, it will be understood that other applications of the invention are possible and that other embodiments disclosed may be subjected to various changes, modifications, and substitutions without necessarily departing from the spirit of the invention.

What is claimed and desired to be secured by Letters Patent is:

1. A culinary gluten-free flour consisting of, on a weight basis, from about 30% to about 70% alpha-cellulose, from about 30% to about 70% edible starch, and from about 1% to about 10% of a cellulosic gum.

2. The culinary flour according to claim 1 wherein the cellulosic gum consists of hydroxypropylmethylcellulose.

3. The culinary flour according to claim 1 wherein the cellulosic gum consists of sodium carboxymethylcellulose.

4. The culinary flour according to claim 1 wherein the cellulosic gum consists of hydroxypropylmethylcellulose and sodium carboxymethylcellulose at a respective weight ratio ranging from about 2:1 to about 1:1.

5. The culinary flour according to claim 1 wherein the edible starch is selected from the group consisting of wheat starch, corn starch, and mixtures thereof.

6. The culinary flour according to claim 1 wherein the alpha-cellulose has a particle size smaller than 140 mesh (U.S. Standard Sieve).

7. A culinary yeast leavened batter consisting essentially of about 90 parts by weight of the gluten-free flour of claim 1, 10 parts by weight of a mixture of sugar, yeast, fat, salt, and plasticizer together with sufficient water to form a batter having a pourable consistency.

8. The culinary yeast leavened batter of claim 7 further having egg white as an ingredient in an amount effective to produce an appealing brown colored crust when the batter is baked.

9. A low-calorie baked product prepared by baking the batter of claim 7.

References Cited

UNITED STATES PATENTS

| Re. 16,004 | 2/1925 | Hamor et al. | 99—83 |
| 3,574,634 | 4/1971 | Singer | 99—86 |

RAYMOND N. JONES, Primary Examiner

J. R. HOFFMAN, Assistant Examiner

U.S. Cl. X.R.

99—90 S, 93